United States Patent [19]

Satoh et al.

[11] Patent Number: 4,853,816

[45] Date of Patent: Aug. 1, 1989

[54] CASING FOR CASSETTE MAGNETIC TAPE

[75] Inventors: Takateru Satoh; Kimio Tanaka; Morimasa Sasaki, all of Nagano, Japan

[73] Assignee: TDK Corporation, Japan

[21] Appl. No.: 67,933

[22] Filed: Jun. 29, 1987

[30] Foreign Application Priority Data

Jun. 27, 1986 [JP] Japan .................................. 61-97749

[51] Int. Cl.4 ............................................ G11B 23/02
[52] U.S. Cl. .................................................. 360/132
[58] Field of Search ....................... 360/132; 242/199; 206/444, 389

[56] References Cited

U.S. PATENT DOCUMENTS

| | | | |
|---|---|---|---|
| 4,635,879 | 1/1987 | Sumida | 360/132 |
| 4,642,722 | 2/1987 | Gebeke | 360/132 |
| 4,742,417 | 5/1988 | Komiyama | 360/132 |

Primary Examiner—A. J. Heinz
Attorney, Agent, or Firm—Steinberg & Raskin

[57] ABSTRACT

A casing for a magnetic tape cassette capable of constantly actuating a slider with high reliability for a long period of time, even under conditions of high temperature. The casing includes a casing body having an upper casing member and a lower casing member joined together, and a tapping boss of high rigidity arranged therein, with a slider being slidably mounted on the lower casing member so as to cover at least a part of a bottom and sides of the lower casing member. The casing also includes a torsion spring arranged in the casing body to act on the slider, the torsion spring having a coil-like portion supported on a supporting member mounted on the lower casing member, and an end of the torsion spring engaged with the slider. The other end of the torsion spring is securely held in an engagement portion formed at the tapping boss.

7 Claims, 7 Drawing Sheets

CASING FOR CASSETTE MAGNETIC TAPE

BACKGROUND OF THE INVENTION

The present invention relates to a casing for a magnetic tape cassette, and more particularly to a casing for a magnetic tape cassette which is conveniently used to record a digital signal such as, for example, a PCM signal.

A PCM recording and reproducing apparatus which is adapted to convert an analog signal, such as an acoustic signal or the like, into a digital signal such as, for example, a PCM signal, and in record the digital signal on a magnetic tape element for producing the same has recently been proposed. One example of such conventional PCM recording and reproducing apparatus, is typically constructed to use a rotary head for carrying out recording on a magnetic tape element at a relatively high density. More particularly, the recording and reproducing apparatus is adapted to draw out the magnetic tape element from a casing and wind it up on a rotating drum which is provided with the rotary head during its recording or reproducing operation.

A magnetic tape cassette used in such a PCM recording and reproducing apparatus is likely to cause a drop out to occur in a reproducing signal when a fingerprint, dust or the like adhere to a magnetic tape element. In order to avoid such a problem, it is necessary to keep the magnetic tape element in a casing as much as possible to protect the same. Also, in order to assure smooth drawing-out of the tape element from the casing during recording or reproducing, it is necessary to provide the casing with a space through which guide means of the apparatus are permitted to be inserted into the cassette casing.

In order to meet such requirements, a casing for a magnetic cassette was proposed which is typically constructed in such a manner as illustrated in FIGS. 1 to 4. More particularly, the casing includes a casing body 100 comprising an upper casing member (not illustrated) and a lower casing member 102 joined together to define a space therein for housing a magnetic tape element therewithin. The casing also includes a slider 104 slidably mounted on the lower casing member 102 so as to be slidable in a longitudinal direction of the casing body 100. The slider 104 is formed into a shape and a size sufficient to cover a bottom and a part of each of both lateral sides of the lower casing member 102. The casing is provided at a front portion thereof, with an opening which is selectively closed by a front cover (not illustrated). The front cover is pivotally mounted at the front portion of the casing body so that the cover may be actuated due to sliding movement of the slider 104 to selectively cover the front opening of the casing.

Figure 1:
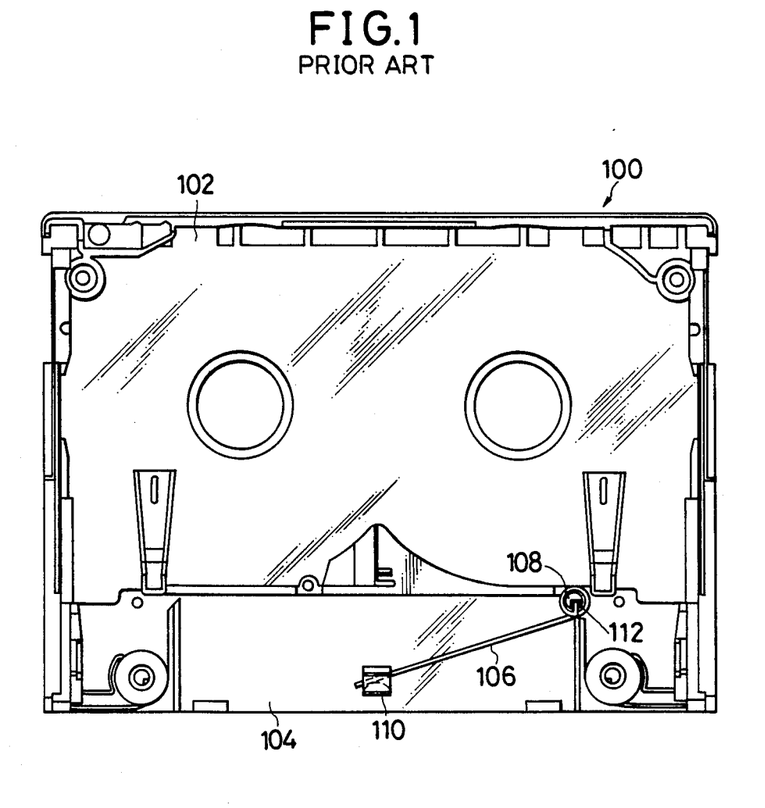
FIG. 1 is a plan view illustrating a lower casing member and a slider of a conventional casing for a magnetic tape cassette, wherein the slider is positioned at a forward or foremost close the casing.
Figure 2:
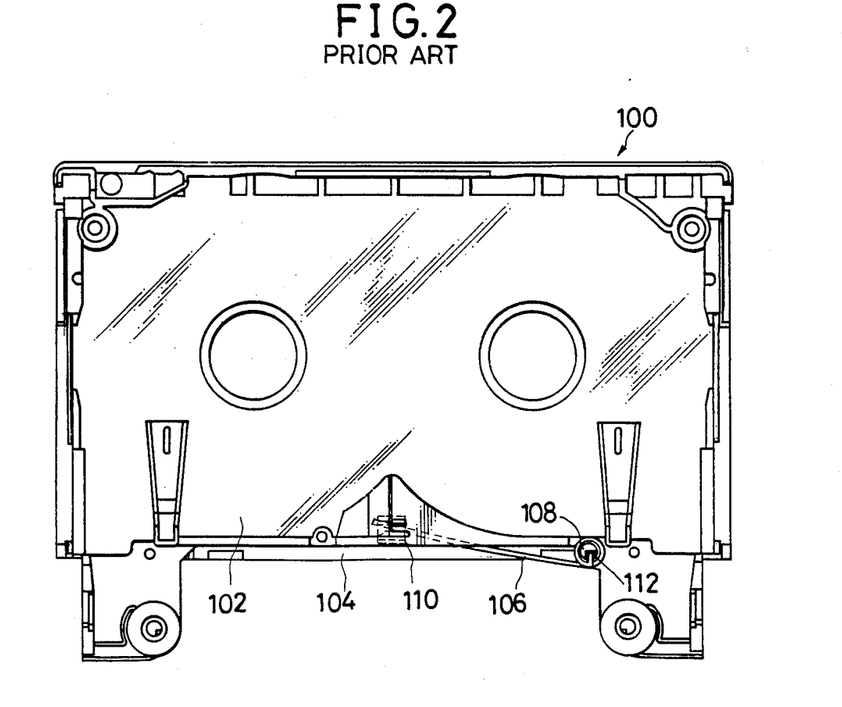
FIG. 2 is a plan view of the lower casing member and slider illustrated in FIG. 1, wherein the slider has been moved to a rearward or rearmost position to open the casing.
Figure 3:
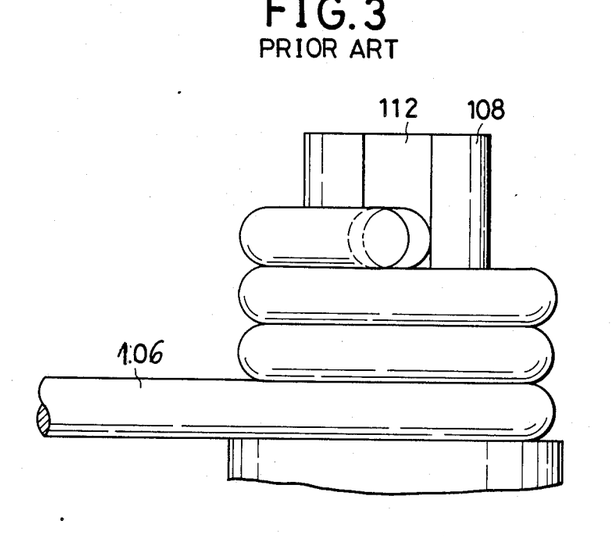
FIG. 3 is a side elevational view illustrating a boss arrangement used, in the conventional casing of FIG. 1.
Figure 4:
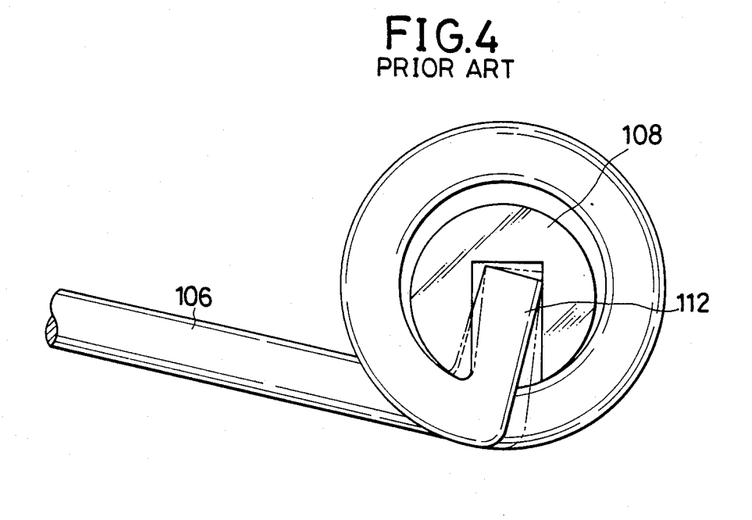
FIG. 4 is a plan view of the boss arrangement illustrated in FIG. 3.

When the casing constructed as described above in which a magnetic tape element has been arranged therein to form a magnetic tape cassette, is inserted into a recording and reproducing apparatus, the slider 104 is moved in a rearward direction of the casing from a forward or foremost position illustrated in FIG. 1 to a rearward or rearmost position illustrated in FIG. 2, to pivotally move the front cover to expose the front opening of the casing, so that the magnetic tape element may be exposed through the front opening of the casing. During non-use of the magnetic tape cassette, the slider 104 is positioned at the forward position illustrated in FIG. 1, to close the front opening of the casing together with the front cover to sealingly maintain the magnetic tape element within the casing body.

In the conventional casing constructed as described above, and as illustrated in FIGS. 1 to 4, a torsion spring 106 is used which is supported, at a coil-like portion thereof, on a support boss 108 mounted on the lower casing member 102. The torsion spring 106 is engaged at one end thereof with the slider 104 through a stopper 110 and securely held at the other end thereof in a groove 112 formed on the boss 108.

The boss 108 for supporting the coil-like portion of the torsion spring 106, is formed into a thin shape in order to prevent formation of a sink mark thereon during injection molding. Accordingly, formation of the groove-like engagement 112 at the boss 108 causes a wall thickness of the boss 108 to be substantially decreased. Also, the end of the torsion spring 106 must be formed to have a length reduced to a sufficient degree to cause great force to be exerted on the boss 108, due to configuration of the support boss. Accordingly, when the boss is exposed to such a high temperature as encountered in a recording and reproducing apparatus under such conditions, the groove 112 of the boss 108 is subjected to such deformation as indicated by the chain lines in FIGS. 3 and 4. This causes a stroke of the torsion spring 106 to vary to a degree such that the force applied from the torsion spring to the slider 104 is significantly varied, thereby adversely affecting actuation of the slider.

Accordingly, it would be highly desirable to develop a casing for a magnetic tape cassette which is capable of continuously accomplishing stable actuation of a slider, with high reliability and for a long period of time, even under conditions of high temperature.

SUMMARY OF THE INVENTION

Accordingly, it is an object of the present invention to provide a casing for a magnetic tape cassette which is capable of permitting the magnetic tape cassette to be operated with satisfactory reliability for a long period of time.

It is another object of the present invention to provide a casing for a magnetic tape cassette which is capable of allowing the magnetic tape cassette to exhibit satisfactory function for a long period of time.

It is a further object of the present invention to provide a casing for a magnetic tape cassette which is capable of constantly accomplishing stable actuation of a slider with high reliability for a long period of time.

It is still another object of the present invention to provide a casing for a magnetic tape cassette which is capable of permitting a torsion spring to exert constant force for a long period of time, even under conditions of high temperature.

It is yet another object of the present invention to provide a casing for a magnetic tape cassette which is capable of stably supporting a torsion spring is a casing body.

It is still a further object of the present invention to provide a casing for a magnetic tape cassette which is able to accomplish the above-noted objects with simple structure.

Still other objects and advantages of the present invention will become apparent from the following description below.

These and other objects are attained by the present invention which is departed to a tape cassette casing, comprising an upper casing member and a lower casing member adapted to be joined together to define a space therebetween. At least one tapping boss is provided on one of the upper and lower casing members. A slider is slidably mounted upon the casing and is positioned to cover at least a part of a bottom and lateral sides of the lower casing member, with a torsion spring being arranged on the casing and disposed to act upon the slider. Means for supporting the torsion spring on one of the upper and lower casing members, are also provided.

The torsion spring comprises two ends and a coil-like portion situated therealong between the ends thereof. One of the ends of the spring is engaged with the slider. The tapping boss comprises an engagement portion for receiving the other end of the spring and securely retaining the same. Furthermore, the support means are positioned to support the coil-like portion of the spring.

Briefly speaking, in accordance with the present invention, a casing for a magnetic tape cassette is provided. The casing includes a casing body which comprises an upper casing member and a lower casing member joined together to define a space therein for housing a magnetic tape element, and is furthermore provided with at least one tapping boss. The casing also includes a slider slidably mounted on the casing body, so as to be slidable in a longitudinal direction of the casing body, and arranged so as to cover at least a part of a bottom wall and both lateral side walls of the lower casing member. The slider is engaged with one end of a torsion spring arranged in the casing body. The lower casing member is provided thereon with a support for holding a coil-like portion of the torsion spring thereon, with the tapping boss being formed with an engagement for securely retaining the other end of the torsion spring.

BRIEF DESCRIPTION OF THE DRAWINGS

For a fuller understanding of the present invention, reference is made to the following description taken in conjunction with the accompanying drawings, in which like reference numerals designate like parts there throughout.

In the drawings

DESCRIPTION OF THE PREFERRED EMBODIMENTS

A casing for a magnetic tape cassette according to the present invention will now be described below, with reference to FIGS. 5 to 8.

Figure 5:
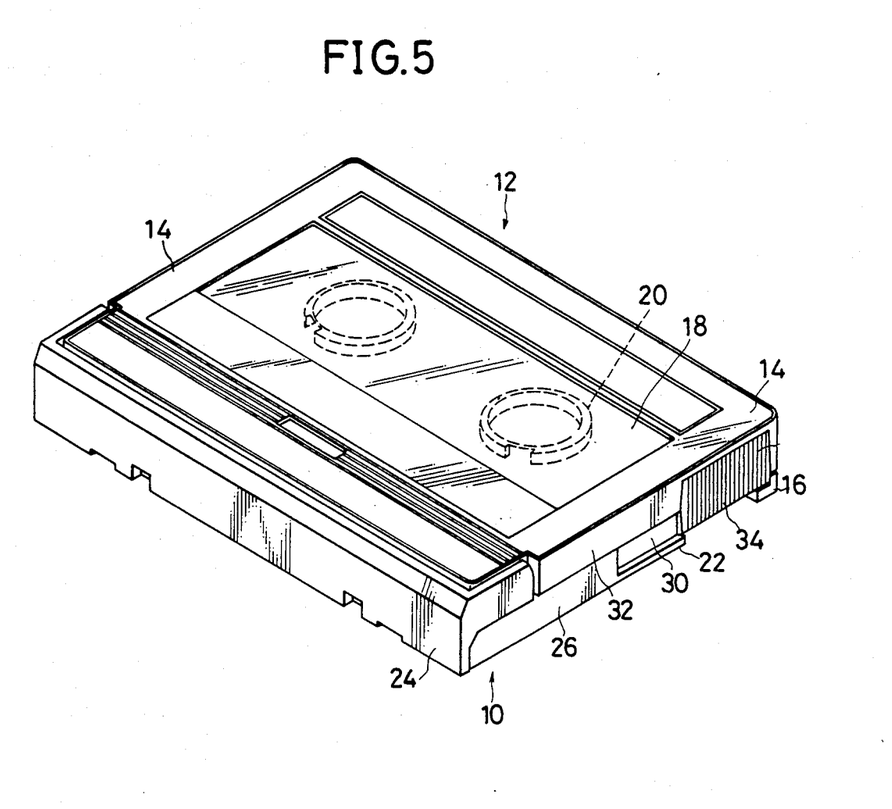
FIG. 5 is a perspective view illustrating an embodiment of a casing for a magnetic tape cassette according to the present invention.
Figure 6:
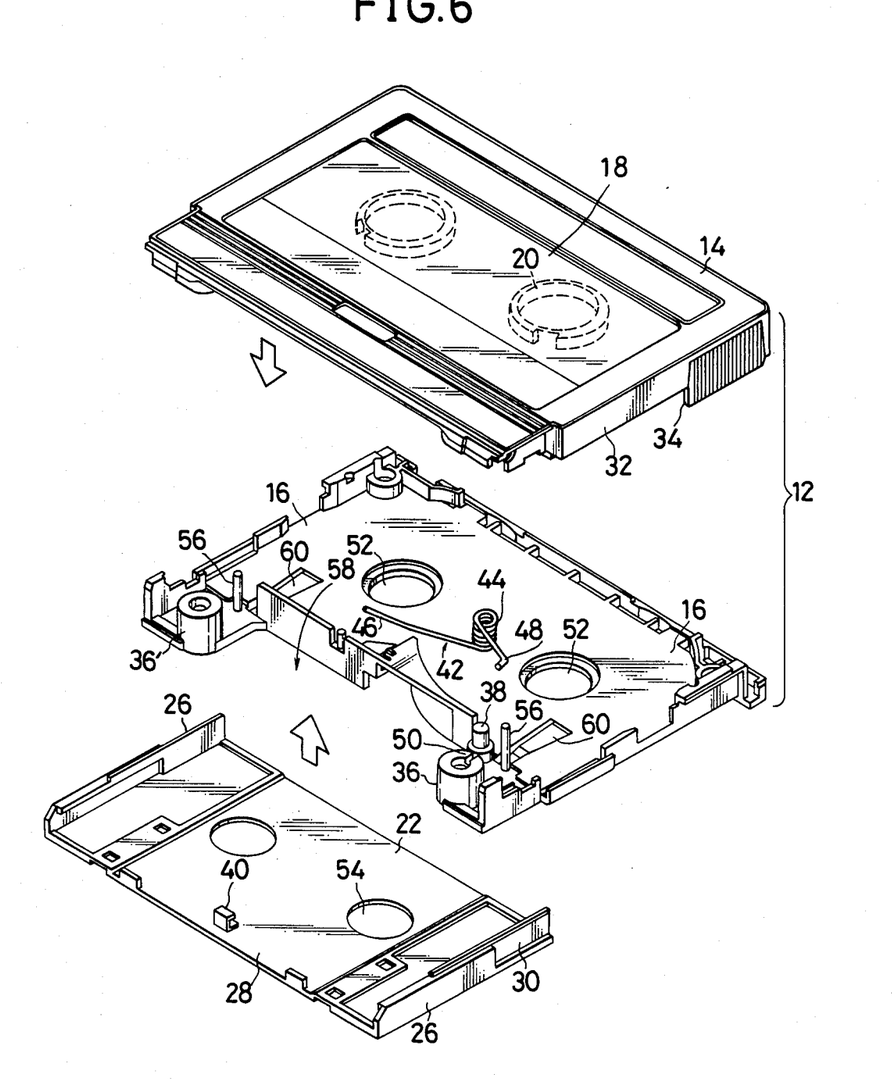
FIG. 6 is an exploded perspective view of the casing shown in FIG. 5.

FIGS. 5 and 6 illustrate, an embodiment of a casing for a magnetic tape cassette according to the prevent invention. A casing of the illustrated embodiment is generally designated by reference numeral 10, and includes a casing body 12 comprising an upper casing member 14 and, a lower casing member 16 integrally joined together by means of screws to define a space therein. The upper casing member 14 is provided with a transparent window 18 through which a magnetic tape element received in the space of the casing is observed. A pair of hub regulating ribs 20 is attached to the transparent window 18. The casing of 10 also includes a slider 22 slidable, mounted on the lower casing member 16 so as to be slidable in a longitudinal direction of the casing body 12.

In the casing body 12 constructed as described above, a pair of reel hubs (not illustrated) on which a magnetic tape element is movably wound, is rotatably housed through the hub regulating ribs 20. The casing body 12 is provided at a front portion thereof with a front cover 24, which is pivotally mounted on the casing body 12 to open and close a front opening formed at the front portion of the casing body together with slider 22. The slider 22 may be operatively connected to the front cover 24 to open and close the front opening of the casing body in cooperation with the front cover 24. The connection between the slider 22 and the front cover 24 may be carried out in such a manner as widely known in the art. In the illustrated embodiment, the slider 22 is formed into a substantially U-shape so as to cover a bottom wall of the lower casing member 16 and a part of each of both lateral side walls thereof. More particularly, the slider 22, as illustrated in FIG. 6, is formed to have two substantially vertical walls 26 and a bottom wall 28 interposed between the vertical walls 26. Also, the slider 22 is formed at a rear portion of each of the vertical walls 26, with a recess 30 acting as a relief. Correspondingly, the upper casing member 14 is provided at a rear portion of each of both side walls 32 thereof, with a holder 34 through which the casing 10 is grasped by an operator. The holder 34 may comprise an extension formed by downwardly projecting the rear portion of each of the side walls 32 of the upper casing member 14. The recess 30 acts as a relief which prevents the holder from interfering with the slider 22, to ensure smooth movement of the slider 22 when it is slided in a rearward or backward direction of the casing body 12.

In the illustrated embodiment, the lower casing member 16 is provided on both front sides of an upper surface thereof, with a pair of tapping bosses 36 and 36', as in the conventional casing of FIGS. 1-4. Also, the lower casing member 16 is provided, on the upper surface thereof, with a support boss 38 at a position adjacent to one of the tapping bosses or adjacent to the tapping boss 36 on the upper surface of the lower member 16, as best seen in FIG. 6. Correspondingly, the slider 22 is provided with a stopper 40 thereon.

The casing 10 of the illustrated embodiment, further includes a torsion spring 42 which is fittedly supported at a coil-like portion 44 thereof on the support boss 38 of the lower casing member 16. The torsion spring 42 is engaged at one end 46 thereof with the stopper 40 of the slider 22, and is securely held at the other end 48 thereof in an engagement 50 formed at the tapping boss 36. The engagement 50 may comprise a groove-like notch or cutout. Alternatively, the engagement 50 may comprise a hole formed in a wall of the boss 36.

In FIG. 6, reference numerals 52 and 54 each denote holes through the lower casing member 16 and the slider 22 respectively, through which shafts of reels are inserted. Reference numeral 56 designates the guide pins, reference numeral 58 denotes an opening which is formed at a front portion of the lower casing member 16 and adapted to be selectively closed by the slider 22, while reference numeral 60 designates lock members each being formed of an elastic material.

Figure 7:
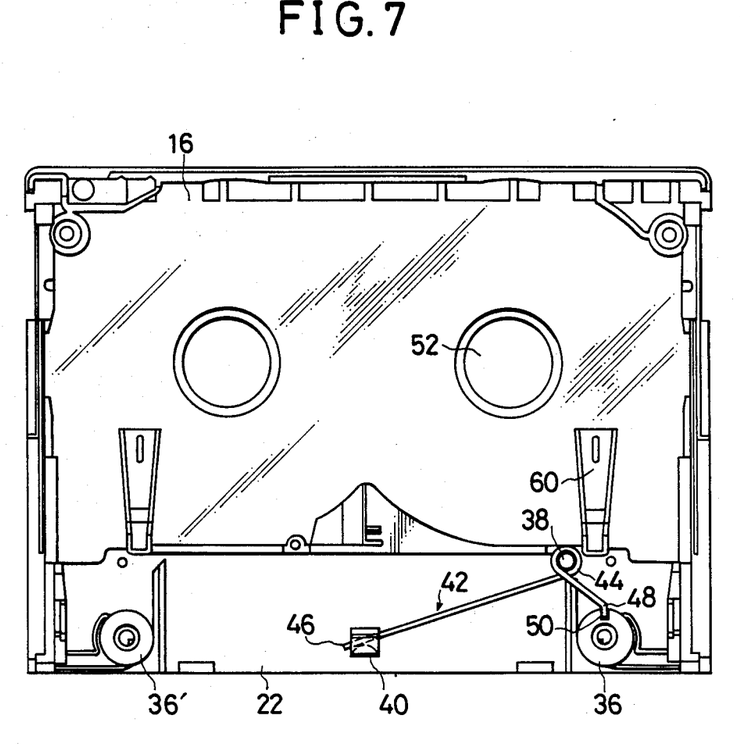
FIG. 7 is a plan view illustrating a lower casing member and a slider of the casing illustrated in FIG. 5, wherein the slider is at a forward or foremost position to close the casing.
Figure 8:
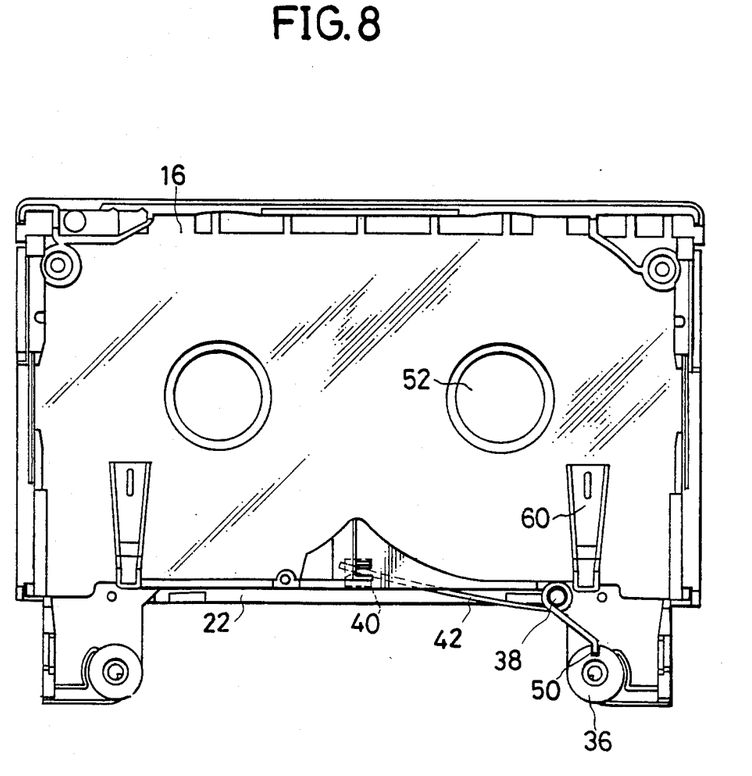
FIG. 8 is a plan view of the lower casing member and slider illustrated in FIG. 7 wherein the slider has been moved to a rearward or rearmost position to open the casing.

In the casing of the illustrated embodiment constructed as described above, during non-use of the magnetic tape cassette, the slider is held at such a forward or foremost position as illustrated in FIG. 7, due to action of the torsion spring 42 to close the opening 58 and cause the front cover 24 to close the front opening 58 of the casing body 12. Thus, a magnetic tape element is sealingly safely maintained within the casing 10. When the magnetic tape cassette is charged into a recording and reproducing apparatus, the slider 22 is moved in a backward or rearward direction of the casing 10 against the force of the torsion spring 42, to open the opening 58 of the lower casing member 16. Concurrently, the front cover 24 is pivotally moved to open the front opening 58 of the casing body 12.

As can be seen from the foregoing, the casing of the present invention is so constructed that the other end 48 of the torsion spring 42 supported at the coil-like portion 44 thereof on the support means 38, is securely held in the engagement 50 formed at the tapping boss 36 which is formed to exhibit high rigidity and have a large wall thickness as compared to the support boss 38. Such construction allows the other end 48 of the torsion spring 42 to be increased into a sufficient length to reduce force applied thereto. Also, this effectively prevents the engagement 50 of the tapping boss 36 from being deformed, even under conditions of high temperature.

Accordingly, exertion of the same force by the torsion spring for a long period of time is ensured, resulting in the slider 22 being stably actuated. Furthermore, the tapping boss 36 itself has been conventionally employed in such a casing for a magnetic tape cassette. Accordingly, the present invention permits the above-noted advantages to be attained with simple structure. Both tapping bosses 36 and 36' may be provided with an engagement 50. It is also pointed out that the terms "upper", or "lower", "bottom", and "vertical" as used herein, are merely relative terms of position of components of the invention cassette casing, with respect to one another.

It is thus seen that the objects set forth above, among those made apparent from the preceding description, are efficiently attained with the present invention herein, with certain changes being possible in the scope of the above description without departing from the spirit and scope of the present invention. It is therefore intended that all the description above, including the illustrations in the accompanying drawings, shall be interpreted as merely illustrative, and not at all in a limiting sense.

We claim:

1. A tape cassette casing, comprising
    an upper casing member and a lower casing member adapted to be joined together to define a space therebetween,
    at least one tapping boss provided on said lower casing member,
    a slider slidably mounted upon said casing and positioned to cover at least a part of a bottom and lateral sides of said lower casing member,
    a torsion spring arranged on said casing and disposed to act upon said slider, and
    means for supporting said torsion spring on said lower casing member,
    wherein said torsion spring comprises two ends and a coil-like portion situated therealong between said ends thereof,
    one of said ends of said spring being engaged with said slider,
    said tapping boss comprising an engagement portion for receiving said other end of said spring and securely retaining said other end within said engagement portion;
    said support means positioned to support said coil-like portion of said spring and comprising a supporting boss mounted upon said lower casing member and positioned to receive said coil-like portion of said spring thereabout, and
    said coil-like portion of said torsion spring being closer to said end thereof received by said tapping boss than said end thereof engaged with said slider.
    whereby stroke of said torsion spring is maintained as steadily as possible and said slider is stately actuated.

2. The casing of claim 1, comprising two tapping bosses on said lower casing member.

3. The casing of claim 2, wherein each said tapping boss comprises an engagement portion.

4. The casing of claim 1, wherein said engagement portion of said tapping boss comprises a groove-like notch.

5. The casing of claim 1, wherein said engagement portion of said tapping boss comprises a hole formed through a wall of said tapping boss.

6. The casing of claim 1, wherein said slider comprises a stopper thereon for engaging said respective end of said spring.

7. The casing of claim 1, wherein said tapping boss is highly rigid and has a large wall thickness as compared to said supporting boss,
    so that said engagement portion thereof is prevented from being deformed, even under conditions of high temperature, and
    length of said torsion spring between said coil-like portion thereof and said end thereof received by said tapping boss is sufficiently increased to reduce force applied thereto.

* * * * *